United States Patent Office 2,977,676
Patented Apr. 4, 1961

2,977,676
DUCTILE IRON WELDING ROD AND METHOD OF WELDING

Raymond F. Sherwin, Highland Park, and Sam J. Marabella, Winthrop Harbor, Ill., assignors to The Chicago Hardware Foundry Company, North Chicago, Ill., a corporation of Illinois No Drawing. Filed Apr. 24, 1958, Ser. No. 730,522

4 Claims. (Cl. 29—495)

The present invention is directed to improvements in the art of welding ferrous articles and, more particularly, to the welding of ductile or so-called nodular cast iron articles.

Ductile cast iron has become more important commercially because in many ways it possesses the desirable qualities of both cast iron and steel, and is stronger and more ductile than ordinary cast irons. Some difficulties have arisen, however, in welding this type of cast iron because it has been found difficult to match the characteristics of the weld deposit with that of the base metal, particularly with regard to color and expansion characteristics. In some instances, also, it has been difficult to produce weld deposits for this type of cast iron which are reasonably free from porosity, and undesirable residues.

We have now found that through a control of the composition of the ductile cast iron, we can produce a ductile cast iron welding rod which overcomes the disadvantages and provides a weld deposit which has excellent workability, flowability, and good penetration properties. When this type of welding rod is employed with a modified borax flux, we have been able to produce welds on ductile iron sheets which are completely machineable and are free from porosity and other adverse effects.

An object of the present invention is to provide an improved ductile iron welding rod particularly suitable for use in welding ductile cast iron.

Still another object of the invention is to provide an improved method for the welding of ferrous articles, particularly ductile cast iron to produce a weld deposit having excellent flowability and penetration properties.

Still another object of the invention is to provide an improved method for the welding of ferrous articles which employs a welding rod of a specific type of ductile cast iron composition in combination with a flux which has been found particularly suitable for such welding.

The analysis which we have found particularly suitable for the welding rod of the invention is given in the following table:

Table I

| | Percent |
|---|---|
| Silicon | 2.75 to 3.00 |
| Manganese | 0.20 to 0.40 |
| Total carbon | 3.50 to 4.00 |
| Phosphorus | 0.02 to 0.06 |
| Magnesium | 0.050 to 0.10 |
| Sulfur, max. | 0.020 |

Iron—substantially the balance.

A particularly preferred rod for the purposes of this invention is one having the following analysis:

| | Percent |
|---|---|
| Silicon | 2.75 |
| Manganese | 0.21 |
| Total carbon | 3.62 |
| Phosphorus | 0.040 |
| Sulfur | 0.012 |
| Magnesium | 0.067 |

Iron—substantially the balance.

Unlike ordinary cast iron, a casting composed of the foregoing analysis evidences a microstructure exhibiting graphite spheroids surrounded by ferrite rings in a matrix of fine pearlite. We prefer to use the welding rod in its as-cast condition rather than heat treating or annealing the rod, in which case the pearlite is largely transformed into a ferritic matrix.

In order to realize the maximum benefit from the use of the improved rod, we have found it very desirable to employ the rod in conjunction with a borax-type flux containing boric acid, borax and soda ash in the following proportions by weight:

Table II

| | Percent |
|---|---|
| Boric acid | 60–80 |
| Anhydrous borax | 5–20 |
| Soda ash | 10–30 |

The flux may also contain small amounts of manganese dioxide ranging from about 0.01 to 0.05% by weight.

In the preparation of the flux, in fifteen pound batches, 3 pounds of granulated boric acid and 3 pounds of dense soda ash were milled together into a relatively fine powder. Then, an additional 7½ pounds of granulated boric acid were combined with 1½ pounds of anhydrous borax and 14 grams of manganese dioxide, combined with the product of the first milling operation, and the mixture was milled for an additional 10 minutes to produce a flux consistency suitable for gas welding.

The rod and flux are used together in the normal way for welding with gas-burning torches, either by dipping the rod in the flux or by applying the flux separately to the articles to be welded. Generally, a neutral flame is desirable in the welding operation although this factor is not particularly critical.

Tests made using the improved rod and flux combination on test plates composed of ductile iron have proved the rod to be completely satisfactory with respect to workability, flowability, and penetration. The hardness measurements of the welded area across the weld were quite uniform, ranging from 277 to 280 Brinell on several test plates, and uniformly at about 255 on others. This range of hardness provides a weld of excellent machineability. The welds were also found to be substantially free of objectionable porosity, oxide occlusions, and had a coefficient of expansion substantially the same as that of the underlying metal.

It will be evident that various modifications can be made to the described embodiment without departing from the scope of the present invention.

We claim as our invention:

1. The method of producing a ductile weld deposit on a ferrous article which comprises heating a welding rod having the following compositions:

| | Percent |
|---|---|
| Silicon | 2.75 to 3.00 |
| Manganese | 0.20 to 0.40 |
| Total carbon | 3.50 to 4.00 |
| Phosphorus | 0.02 to 0.06 |
| Magnesium | 0.050 to 0.10 |
| Sulfur, max. | 0.020 |

Iron—substantially the balance.

and depositing a weld deposit from said rod in the presence of a flux consisting essentially of the following composition:

| | Percent |
|---|---|
| Boric acid | 60–80 |
| Anhydrous borax | 5–20 |
| Soda ash | 10–30 |

2. The method of producing a ductile weld deposit on a ferrous article which comprises heating a welding rod having the following composition:

| | Percent |
|---|---|
| Silicon | 2.75 to 3.00 |
| Manganese | 0.20 to 0.40 |
| Total carbon | 3.50 to 4.00 |
| Phosphorus | 0.02 to 0.06 |
| Magnesium | 0.050 to 0.10 |
| Sulfur, max. | 0.020 |
| Iron—substantially the balance. | | said rod being in its as-cast condition, and depositing a weld deposit from said rod in the presence of a flux consisting essentially of the following composition:

| | Percent |
|---|---|
| Boric acid | 60–80 |
| Anhydrous borax | 5–20 |
| Soda ash | 10–30 |

3. The method of producing a ductile weld deposit on a ferrous article which comprises heating a welding rod having the following composition:

| | Percent |
|---|---|
| Silicon | 2.75 to 3.00 |
| Manganese | 0.20 to 0.40 |
| Total carbon | 3.50 to 4.00 |
| Phosphorus | 0.02 to 0.06 |
| Magnesium | 0.050 to 0.10 |
| Sulfur, max. | 0.020 |
| Iron—substantially the balance. | | said rod being in its as-cast condition and including graphite spheroids surrounded by ferrite rings in a matrix of fine pearlite, and depositing a weld deposit from said rod in the presence of a flux consisting essentially of the following composition:

| | Percent |
|---|---|
| Boric acid | 60–80 |
| Anhydrous borax | 5–20 |
| Soda ash | 10–30 |

4. The method of producing a ductile weld deposit on a ferrous article which comprises heating a welding rod having the following composition:

| | Percent |
|---|---|
| Silicon | 2.75 to 3.00 |
| Manganese | 0.20 to 0.40 |
| Total carbon | 3.50 to 4.00 |
| Phosphorus | 0.02 to 0.06 |
| Magnesium | 0.050 to 0.10 |
| Sulfur, max. | 0.020 |
| Iron—substantially the balance. | | and depositing a weld deposit from said rod in the presence of a flux consisting essentially of the following composition:

| | Percent |
|---|---|
| Boric acid | 60 to 80 |
| Anhydrous borax | 5 to 20 |
| Soda ash | 10 to 30 |
| Manganese dioxide | 0.01 to 0.05 |

References Cited in the file of this patent

UNITED STATES PATENTS

| 2,485,760 | Millis et al. | Oct. 25, 1949 |
| 2,527,037 | Smalley | Oct. 24, 1950 |
| 2,770,871 | Demalander | Nov. 20, 1956 |